J. F. CANNON.
ANIMAL POKE.
APPLICATION FILED DEC. 20, 1911.
1,048,653.
Patented Dec. 31, 1912.
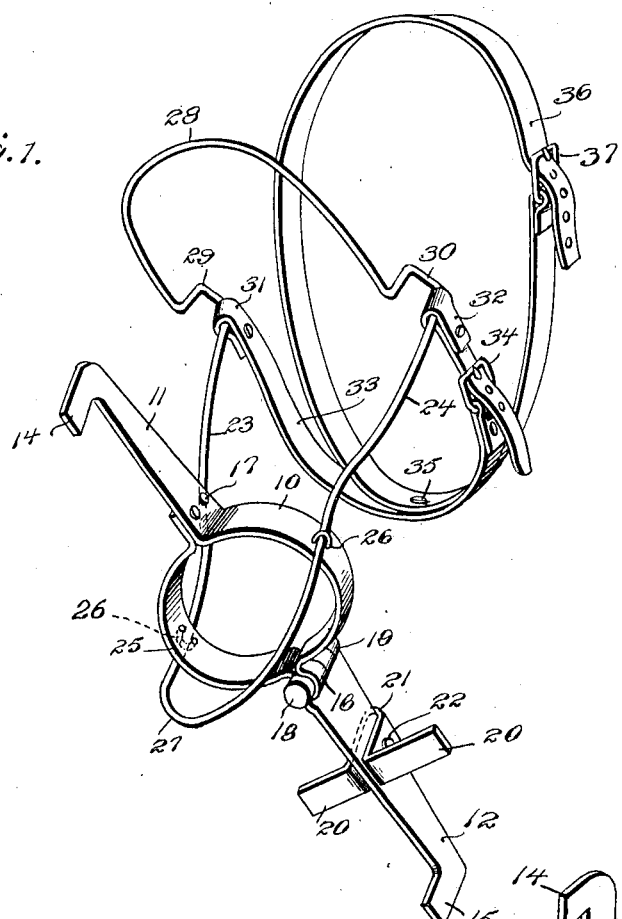
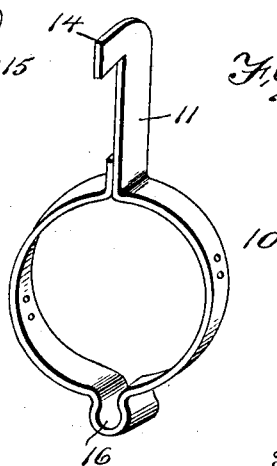
Inventor
John F. Cannon

UNITED STATES PATENT OFFICE.

JOHN F. CANNON, OF GOULD, OKLAHOMA, ASSIGNOR OF ONE-HALF TO J. A. MINTON, OF ERICK, OKLAHOMA.

ANIMAL-POKE.

1,048,653.

Specification of Letters Patent. Patented Dec. 31, 1912.

Application filed December 20, 1911. Serial No. 667,012.

*To all whom it may concern:*

Be it known that I, JOHN F. CANNON, a citizen of the United States, residing at Gould, in the county of Harmon and State of Oklahoma, have invented certain new and useful Improvements in Animal-Pokes, of which the following is a specification.

This invention relates to improvements in animal pokes, and has for one of its objects to provide a lightly constructed device which may be applied to the nose of the animal without inconveniencing the animal or preventing it from feeding or drinking, while at the same time effectually preventing the animal from forcing its way through a fence or other like structure, more particularly wire fences.

Another object of the invention is to provide a device which may be readily applied and adjusted to animals of various sizes and species.

With these and other objects in view, the invention consists in certain novel features of construction as hereafter shown and described, and then specifically pointed out in the claims, and in the drawings illustrative of the preferred embodied of the invention:

Figure 1 is a perspective view of the improved device. Fig. 2 is a perspective view of the nose band portion of the improved device. Fig. 3 is a side view of the head of a cow with the device applied.

Corresponding and like parts are referred to in the following description and indicated in all the views of the drawings by the same reference characters.

The improved device comprises in general a band adapted to encircle the nose of the animal, a wire yoke fastened to the band and extending over the same at the front and likewise extending rearwardly of the band and over the face of the animal below the eyes and secured in place by suitable straps. The device also includes upwardly and downwardly directed arms, the downwardly directed arm being mounted to swing laterally to enable the animal to readily feed or drink. By this means the animal is free to feed and drink while at the same time any attempt to pass through a fence or like structure, especially a wire fence, will be frustrated by the presence of the arms and the portion of the yoke which extends in front of the nose.

The band is represented as a whole at 10, the upper arm at 11 and the lower arm at 12, the latter mounted to swing laterally upon the band. At its upper end the arm 11 is provided with a forwardly directed projection 14, while a similar projection 15 extends forwardly of the arm 12 at its lower end. The band 10 and the arm 11 are preferably formed in a single piece with a loop 16 at the lower side of the band and the other terminal of the band riveted or otherwise secured to the arm 11, as shown at 17. The loop 16 forms a hinge member to receive a pintle 18 whereby eyes 19 upon the upper end of the arm 12 are swingingly coupled to the band. Lateral projections or stops 20 are also connected to the lower arm 12, the two stops being preferably formed from a single piece of sheet metal bent into U-shape at the center as shown at 21 to bear around the arm 12 and riveted or otherwise secured thereto as shown at 22. The arm 12 with its projections 20 is thus free to swing laterally upon the band 10, while at the same time prevented from movement in the opposite direction.

The yoke member is formed of a single piece of wire and comprises side members 23—24 rigidly connected as shown at 25—26, to the sides of the band 10 and extending at its forward end in advance of the band as shown at 27. The side members 23—24 as shown at 27. The side members 23—24 are curved upwardly at their rear ends into a relatively large loop 28 adapted to bear over the face of the animal just beneath the eyes as shown. At the juncture of the side members 23 and the loop 28, the yoke is bent into another smaller loop 29, while a similar smaller loop 30 is formed at the juncture of the side member 24 and the loop 28. The smaller loops 29—30 form means for holding the ends 31—32 of throat straps 33, the latter having a buckle 34 intermediate its ends to enable it to be adjusted to animals of different sizes. Connected at 35 intermediate its ends to the strap 33, is another strap 36 having a buckle 37 at one end, the strap 36 being adapted to extend around the neck of the animal rearwardly of the ears to complete the holding members of the improved device. The band 10 is formed to fit loosely around the nose of the animal, while the forwardly extending portion of the yoke extends across the nose just above the nostrils while the side members 23—24 extend along the cheeks and the loop 28 over the face of the animal just below the eyes. The band 10 will be varied in size to adapt it to the nose of various animals and the yoke will also be varied to conform to the face and cheeks of the animal.

The improved device when applied to the animal, will be held from movement, and when properly fitted the arm 11 will stand in an upwardly directed position, while the arm 12 will hang normally in position below the nose of the animal, and free to be moved laterally by contact with the ground or a drinking vessel when the animal attempts to feed or drink. The band 10 with its arms 11—12 will be preferably constructed from sheet or plate metal, while the yoke 23—24 with its loops 27—28, will be formed of a single piece of wire bent into the required shape and secured in any suitable manner to the band.

The improved device is simple in construction, can be inexpensively manufactured and adapted without material structural change by simply varying the size of the parts to animals of varying forms and different species and may be applied to horses, cows, hogs or sheep.

Having thus described the invention, what is claimed as new is:

1. An animal poke comprising a band adapted to engage around the nose of an animal, an arm directed upwardly from said band, an arm swingingly connected to said band at its lower side, a yoke comprising side members spaced apart and connected to the band and with a transverse portion adapted to engage over the face of the animal at the rear end and a transverse portion for engaging over the nose of an animal at the forward end, and means for connecting said yoke to an animal.

2. An animal poke comprising a band adapted to engage around the nose of an animal, an arm directed upwardly from said band, an arm swinging laterally from the lower side of said band, a yoke including side members connected to said band and with a nose-engaging forward portion and a forehead-engaging rear portion, said yoke having loops at the juncture of the sides and the forehead engaging portions, and a throat strap connected to said loops.

3. An animal poke comprising a band adapted to engage around the nose of an animal, an arm directed upwardly from said band, an arm swinging laterally from the lower side of said band, a yoke including side members connected to said band and with a nose-engaging forward portion and a forehead-engaging rear portion, said yoke having loops at the juncture of the sides and the forehead-engaging portions, a throat strap connected to said loops, and a neck strap connected to said throat strap.

4. An animal poke comprising a band adapted to engage around the nose of an animal, a yoke including side members connected to said band and with a nose-engaging forward portion and a forehead-engaging rear portion, said yoke having loops at the juncture of its sides and forehead-engaging portions, and a throat strap connected to said loops.

5. An animal poke comprising a band adapted to engage around the nose of an animal, an arm directed upwardly from said band, an arm swinging laterally from the lower side of said band, a yoke including side members connected to said band and with a forehead-engaging rear portion, said yoke having loops at the juncture of its sides and forehead-engaging portion, and a throat strap connected to said loops.

In testimony whereof I affix my signature in presence of two witnesses.

JOHN F. CANNON. [L. S.]

Witnesses:
THOMAS A. NEWBERRY,
GARETT M. MOON.

Copies of this patent may be obtained for five cents each, by addressing the "Commissioner of Patents, Washington, D. C."